United States Patent [19]

Spühl

[11] 4,231,723
[45] Nov. 4, 1980

[54] METERING AND CONVEYOR ARRANGEMENT

[75] Inventor: Walter Spühl, St. Gallen, Switzerland

[73] Assignee: Spuhl AG, Gallen, Switzerland

[21] Appl. No.: 927,162

[22] Filed: Jul. 24, 1978

[30] Foreign Application Priority Data

Jul. 26, 1977 [CH] Switzerland ............... 9238/77

[51] Int. Cl.³ ................ F04B 23/06; F04B 49/00
[52] U.S. Cl. ........................... 417/429; 92/13.3; 417/63
[58] Field of Search ............ 74/104, 105; 92/13.3; 417/426, 429, 539, 519

[56] References Cited

U.S. PATENT DOCUMENTS

| | | | |
|---|---|---|---|
| 2,752,989 | 7/1956 | Jenkins | 417/429 |
| 2,925,780 | 2/1960 | Tear | 417/429 |
| 3,227,325 | 1/1966 | Bates | 417/519 |
| 3,253,518 | 5/1966 | Duemler | 74/104 |
| 3,499,387 | 3/1970 | Zippel | 417/399 |
| 3,737,073 | 6/1973 | Lupert | 417/426 |
| 3,936,046 | 7/1976 | Wynn | 92/13.3 |

FOREIGN PATENT DOCUMENTS

| | | | |
|---|---|---|---|
| 2712610 | 9/1977 | Fed. Rep. of Germany | 417/429 |
| 757184 | 12/1933 | France | 417/539 |
| 1390259 | 4/1975 | United Kingdom | 417/519 |

*Primary Examiner*—William L. Freeh
*Attorney, Agent, or Firm*—Haseltine, Lake & Waters

[57] ABSTRACT

A metering and conveyor arrangement for liquids to be mixed, in which several parallel-connected delivery pumps are actuated by a drive unit. Each liquid is assigned to a pair of delivery pumps. Each pair consists of two piston pumps alternately performing an intake and a discharge cycle. The pumps are moveable relative to each other, as well as perpendicular to the piston rods. A swivel element is joined to the drive unit, and rocker arms are located on both sides. Each of the rocker arms is connected with one of the piston pumps of a pair, and the ends of the piston rods are located and guided in grooves of the rocker arms. Each pair of the piston pumps is regulated by an adjustment spindle which is common to one pair of piston pumps. The adjustment spindle has two parts with opposite threads. They are connected by a lockable coupling. One spindle part is each associated with one piston pump of one pair.

7 Claims, 3 Drawing Figures

METERING AND CONVEYOR ARRANGEMENT

BACKGROUND OF THE INVENTION

The present invention relates to a metering and conveyor arrangement for liquid to be mixed, with several associated delivery pumps being actuated by a drive unit.

Such metering and conveyor arrangements are used, for example, in machines for the production of reaction foam synthetic materials. In order to ensure a perfect chemical reaction of the liquids, the quantities and the mixing ratio must be metered very accurately before being joined in the mixing unit. There are known low-pressure conveyor arrangements where displacement piston pumps are fastened to swiveled trapezoidal holding elements with regulable stroke. The load volume is set via the stroke. The desired mixing ratio is maintained by displacing the pump cylinders parallel to each other so that the basic stroke of the drive unit has different effects on the individual pistons.

The productivity of such an arrangement is relatively small since after each load, the pistons must be moved back to draw in new material. Also, the setting of the mixing ratio is inaccurate and time-consuming and not possible without special tools.

Accordingly, it is an object of this invention to provide a metering and conveyor arrangement of the above-described type which is especially suited for small load quantities and which can be quickly and precisely adjusted without tools.

Another object of the invention is the labor saving and cost reduction resulting from its use.

A further object of the present invention is to provide an arrangement, as described, which is substantially simple in construction, may be economically maintained and serviced, and has a substantially long operating life.

SUMMARY OF THE INVENTION

The objects of the present invention are achieved by assigning to each liquid one pair of delivery pumps. Each pair comprises two piston pumps performing an intake and a discharge stroke; these pumps, to change stroke, can be moved relative to each other and perpendicular to the piston rods. A swivel element is joined to the drive unit with rocker arms on both sides. These arms are each linked to one of the piston pumps of a pair, with the ends of the piston rods being guided in grooves of the rocker arms.

The novel features which are considered as characteristic for the invention as set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
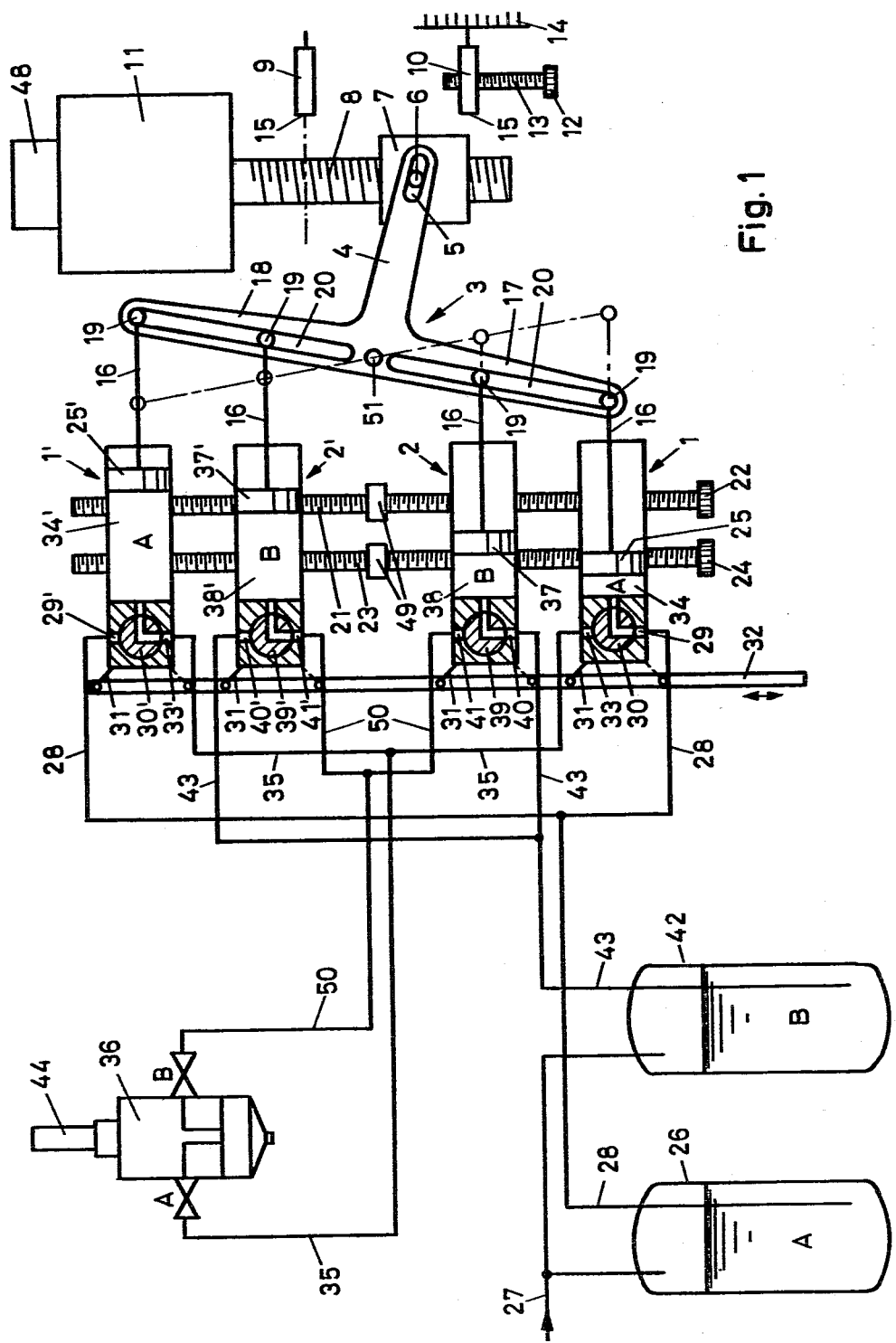
FIG. 1 shows a schematic view of a metering and conveyor arrangement.

The metering and conveyor arrangement shown in FIG. 1 is intended for metering two liquid components, for example, polyol and isocyanate, for the manufacture of reaction foam synthetic material or molding compounds based on polyurethane. The arrangement has two pairs of piston pumps 1, 1'; 2, 2' which are arranged parallel to one another and are actuated by a common swivel element 3. The T-shaped swivel element 3, mounted in the frame at 51, has a rocking lever 4 whose slot 5 engages the trunnion 6 of a carriage 7 moving back and forth.

The carriage 7 is moved by means of a spindle 8 between two end positions 9, 10, with the spindle 8 being alternately driven by a reversible electric motor 11 in either direction of rotation. A spring pressure brake 48, attached to the motor, with power drive provides for quick braking of the motor when it is stopped or reversed. The electric motor preferably is a DC motor with continuously variable speed.

The end positions of the carriage 7 are formed by contactless (proximity) electromagnetic switches 9, 10 which respond and shut off the motor as soon as the carriage is close to one of the contact points 15 of switches 9, 10.

At least one of the switches 9, 10 can be moved by an adjustment spindle 13 with knurled wheel 12 in the direction of the spindle axis. The carriage travel or the swivel motion of swivel element 3 can be changed in this manner. Thus the basic stroke of the piston pumps is set for regulating the quantity. It is expedient to provide next to the movable switch 10, a measuring scale 14, so that the quantity setting can be read directly.

The ends of piston rods 16 of associated piston pumps 1, 1' and 2, 2' of each pair of piston pumps are each connected to a leg 17, 18 of swivel element 3. For this purpose, the ends of piston rods 16 are linked to guide pins 19 which travel in guide grooves 20 of the legs acting as rocker arms 17, 18.

The pair of piston pumps 1, 1' for the liquid component A is movably mounted on an adjustment spindle 21 with handwheel 22. By turning the handwheel 22, both piston pumps 1, 1' are moved synchronously, parallel to each other and perpendicular to the piston axes, with the piston pumps 1, 1' moving towards each other or away from each other. The guide pins 19 in guide grooves 20 of the rocker arms participate in a corresponding movement. In this manner, the piston strokes of both piston pumps 1, 1' can be increased or reduced. The adjustment spindle 21 has two parts, with the two spindle parts having different (opposite) threads and being connected by means of a lockable coupling 49.

During every swivel motion of swivel element 3, the piston 25 or 25' of one piston pump 1 or 1' performs its discharge stroke while the other piston 25' or 25 performs its intake stroke, or vice versa. The liquid component A, stored in tank 26 under compressed air 27 of 0.5–1.5 bar pressure via line 28, is connected to intake pipes 29, 29' of the two piston pumps 1, 1'.

Each piston pump 1, 1' has a two-way valve 30, 30' controlled by the action cycle; these valves are simultaneously reversed by means of lever 31 and a control rod 32. The two-way valves 30, 30' are attached directly to pumps 1, 1'. The drive of the control rod 32, for example by the electric motor or electropneumatically, is not shown in detail.

In the positions of pistons 25, 25' of FIG. 1, intake pipe 29 is open and discharge pipe 33 is closed in one pump 1, while in the other pump 1' the intake pipe 29' is closed and the discharge pipe 33' is open. Piston 25 draws in and the liquid A gets into the cylinder chamber 34. The other piston 25' is in the discharge phase. Liquid A in cylinder chamber 34' is expelled through the discharge pipe 33, enters the pressure line 35, and from there into the mixing unit 36.

The second pair of piston pumps 2, 2' is fastened in a similar manner to a second adjustment spindle 23 with handwheel 24, so that its piston strokes can be varied independently of the setting of the first pair of piston pumps 1, 1'. For the second pair of piston pumps 2, 2', the pistons are denoted by 37 or 37', the cylinder chambers by 38 or 38' and the two-way valves by 39 or 39', the intake pipes by 40 or 40' and the discharge pipes by 41 or 41'.

The liquid component B travels from the tank 42 via line 43 to the piston pumps 2, 2', and from there via pressure line 50 into the mixing unit 36.

In the mixing unit 36, the chemical reaction components A, B, premetered in the proper mixing ratio, are brought together for the first time. The components are mixed intensively and then delivered via nozzle 44 to the mold.

The metering and conveyor arrangement is expressly designed for metering small and minute quantities of 0.5 to 100 grams by the low-pressure method. By simultaneous parallel shifting of both pairs of piston pumps for either liquid component, the mixing ratio can be set precisely and quickly for any desired quantity.

The adjustment is made by turning the handwheels, without tools. The mixing ratio can be correctly reproduced for each load, so that perfect reactions can be achieved.

The two-way valves are attached directly to the pumps and the change-over is made simultaneously and under control. As a result of the tandem arrangement of the pumps, a rapid succession of loads without idle strokes is achieved.

The total load quantity can also be set manually with precision by changing the basic stroke by means of the contactless switch 10. This allows continuously variable quantity setting.

Figure 2:
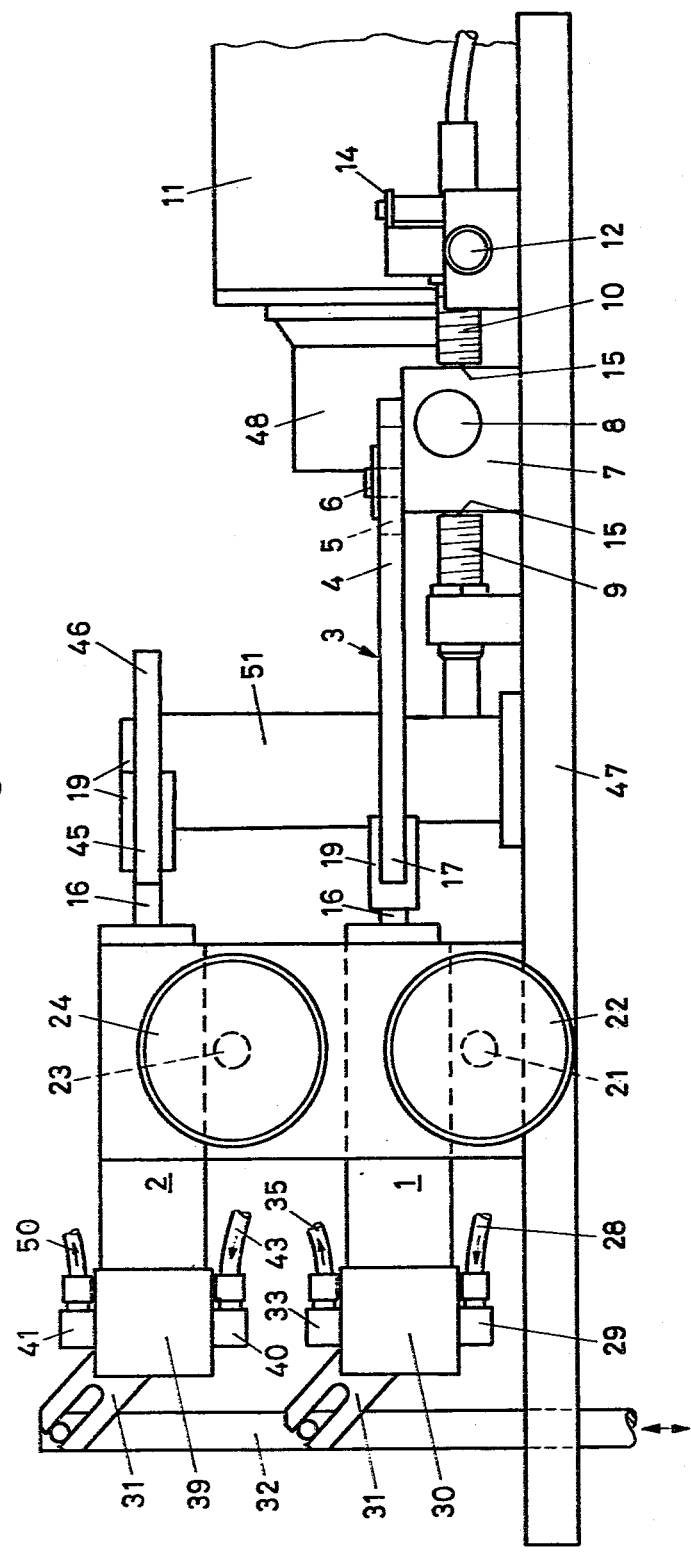
FIG. 2 shows a side view of another metering and conveyor arrangement.
Figure 3:
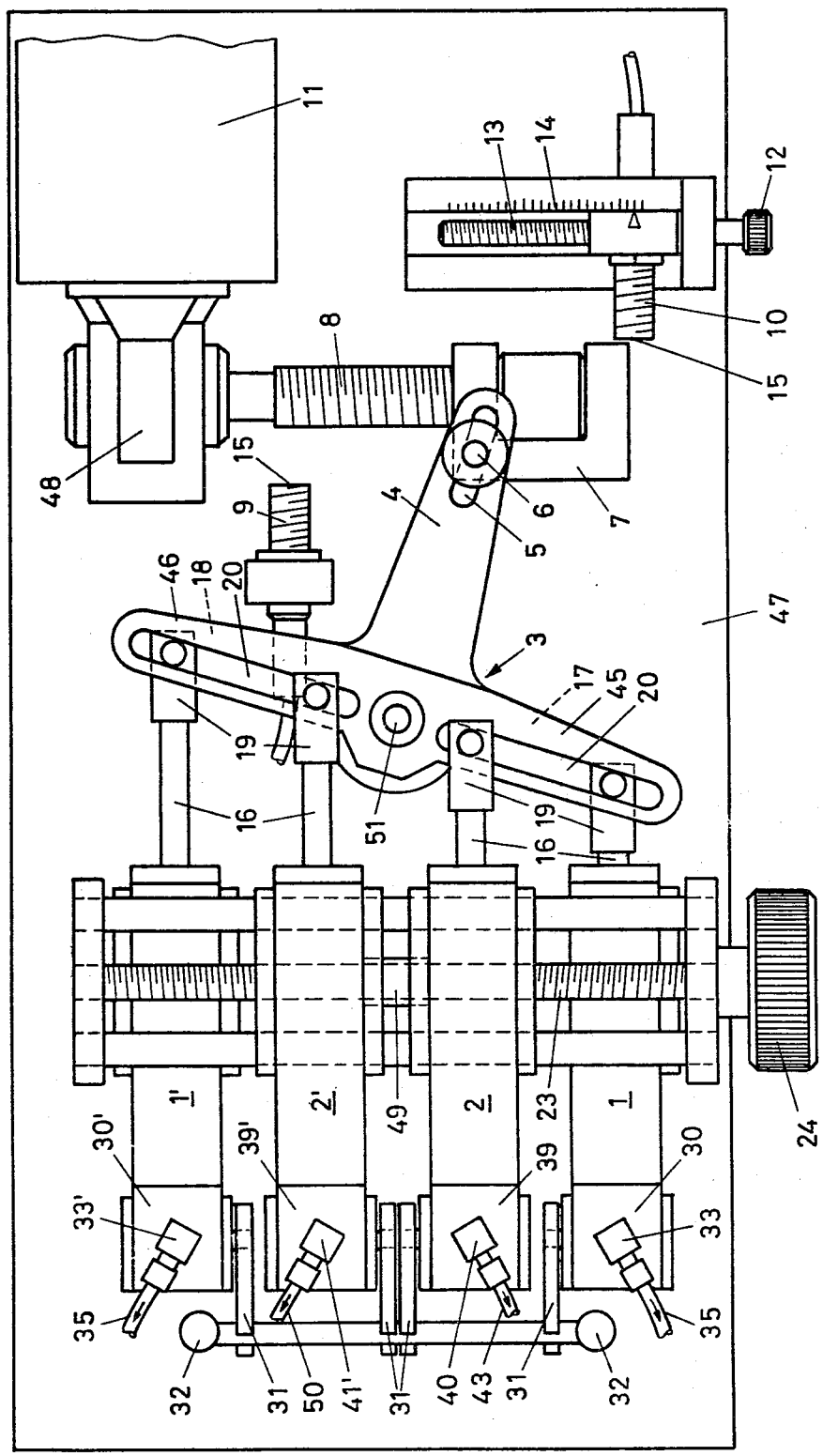
FIG. 3 shows a top view of the conveyor arrangement of FIG. 2.

Of course, it would be possible to meter more than two components by providing additional pairs of pumps. For this purpose, the arrangement shown in FIGS. 2 and 3 is better suited. In this arrangement, the second pair of piston pumps 2, 2' is located above the first pair of piston pumps 1, 1'. Accordingly, pivot element 3 has lower rocker arms 17, 18 and upper rocker arms 45, 46. By suitable stacking vertically, additional paris of piston pumps can be attached in a simple manner. Otherwise, the arrangement of FIGS. 2 and 3 has the same design elements as the arrangement first described. These design have the same referral numbers and therefore are not described again. The design elements are located on a housing plate 47 and are easily accessible and serviceable. The control of the arrangement (not shown in detail) is electro-pneumatically.

The arrangement is simple, requires little maintenance and is not affected by the components to be mixed. The amount handled is independent of the counterpressure and of the viscosity of the material metered and can be set continuously in a very simple manner.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What I claim is:

1. A metering and conveyor arrangement for liquid to be mixed, comprising: a plurality of parallel-connected delivery pumps actuated by drive means, one pair of delivery pumps being assigned to each of said liquids; each pair of pumps comprising two piston pumps with piston rods alternately performing an intake and a discharge cycle, said piston pumps being movable relative to each other and perpendicular to said piston rods; swivel means connected to said drive means; rocker arms located on both sides of said swivel means; each of said rocker arms being connected with one of said piston pumps and having grooves; ends of said piston rods being located and guided in said grooves; an adjustment spindle common to one pair of piston pumps for regulating said pair of piston pumps; each adjustment spindle having two parts with opposite threads; a lockable coupling connecting said parts, one spindle part being associated with one piston pump of a pair of said pumps.

2. A metering and conveyor arrangement as defined in claim 1, including valves on said pumps and having lever means; controlled rod means connected to said lever means for controlling said valves in an operating cycle, said valves providing alternately access to intake openings and discharge openings of said pumps so that one discharge opening and one intake opening is always opened in each pair of said piston pumps.

3. A metering and conveyor arrangement as defined in claim 1 including rocking lever means projecting from said swivel means; carriage means movable back and forth between two end positions by said drive means and being linked to an end of said rocking lever means.

4. A metering and conveyor arrangement as defined in claim 3 including spindle means driven by said drive means for displacing said carriage means.

5. A metering and conveyor arrangement for liquid to be mixed, comprising: a plurality of parallel-connected delivery pumps actuated by drive means, one pair of delivery pumps being assigned to each of said liquids; each pair of pumps comprising two piston pumps with piston rods alternately performing an intake and a discharge cycle, said piston pumps being movable relative to each other and perpendicular to said piston rods; swivel means connected to said drive means; rocker arms located on both sides of said swivel means; each of said rocker arms being connected with one of said piston pumps and having grooves; ends of said piston rods being located and guided in said grooves; rocking lever means projecting from said swivel means; carriage means movable back and forth between two end positions by said drive means and being linked to an end of said rocking lever means; two contactless switches for defining said end positions of said carriage means, at least one of said switches being adjustable for changing the stroke of said carriage.

6. A metering and conveyor arrangement as defined in claim 5 including a measuring scale on said ajustable switch.

7. A metering and conveyor arrangement for liquid to be mixed, comprising: a plurality of parallel-connected delivery pumps actuated by drive means, one pair of delivery pumps being assigned to each of said liquids, each pair of pumps comprising two piston pumps with piston rods alternately performing an intake and a discharge cycle, said piston pumps being movable relative to each other and perpendicular to said piston rods; swivel means connected to said drive means; rocker arms located on both sides of said swivel means; each of said rocker arms being connected with one of said piston pumps and having grooves; ends of said piston rods being located and guided in said grooves; said pairs of delivery pumps being placed on top of one another, a pair of rocking arms being associated with each pair of pumps and being attached to said swivel means, said pairs of rocking arms being also placed on top of one another.

* * * * *